Dec. 21, 1937.  E. R. DARBY ET AL  2,102,998
LINER FOR BEARINGS
Filed April 29, 1936
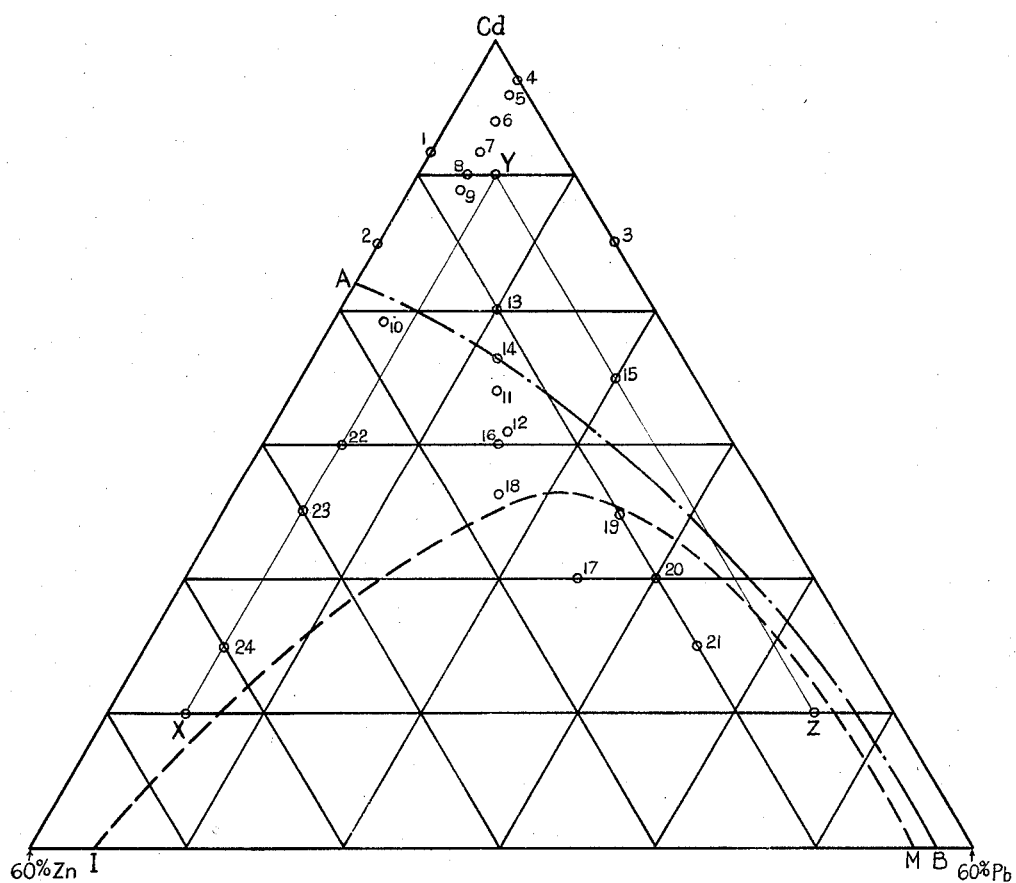
INVENTOR.
Ernest R. Darby.
Philip J. Potter.
BY
ATTORNEYS.

Patented Dec. 21, 1937

2,102,998

UNITED STATES PATENT OFFICE 2,102,998

LINER FOR BEARINGS

Ernest R. Darby and Philip J. Potter, Detroit, Mich., assignors to Federal-Mogul Corporation, Detroit, Mich., a corporation of Michigan Application April 29, 1936, Serial No. 77,004

6 Claims. (Cl. 75—151)

Our invention relates to liners for bearings. It has to do particularly with a novel liner for bearings for rotating shafts designed to operate under heavy loads and at high speeds, although it is not necessarily limited thereto.

The use of relatively soft metals or alloys as liners for bearings is old. One purpose of such use is to provide, as a support for the shaft, a contacting surface which will adequately support a relatively hard shaft or the like and which will, at the same time, avoid scoring or seriously abrading the shaft as it rotates within the bearing.

The metals which have been the most extensively used for this purpose may be generally classed as tin-base and lead-base alloys. The tin-base alloys are mainly composed of tin but usually contain substantial percentages of copper and antimony, increasing in hardness as the contents of copper and antimony are increased. The lead-base alloys are mainly composed of lead, but usually contain significant percentages of one or more of the metals, antimony, tin and copper, which generally serve to harden the alloy.

In addition to the tin-base and lead-base alloys, other alloys are, to a lesser extent, in use as bearing linings. These include alloys consisting of cadmium, zinc and antimony, alloys of cadmium and nickel, alloys of cadmium, silver and copper, and alloys of cadmium and copper. Lead, hardened with one or more alkali metals or alkaline earth metals, such as sodium, calcium, barium and lithium, has also been used as a bearing lining.

It is more or less generally recognized in the art that alloys which are desirable as lining materials for bearings should be composed of harder particles embedded in a relatively soft matrix, or soft particles embedded in a harder matrix, or a matrix in which both harder and softer particles are dispersed. The theory is that the harder particles serve to make the contact and directly carry the load, while the softer particles or matrix permit the lining material to conform to the shape of the moving member or shaft.

A bearing metal of an alloy of cadmium, silver and copper has proved to be quite successful in bearings used in the automotive industry, since the metal can be so proportioned as to give desirable softness and conformability coupled with a relatively high melting point. Likewise, the silver tends to improve the castability. Also, such alloys can be made so as to embody a multiplicity of fine hard particles dispersed throughout a relatively soft and tough matrix.

However, there are some drawbacks to cadmium-silver-copper alloys for use in bearing service. For one thing, under present market conditions, there is a shortage of supply of cadmium, which not only materially increases the cost but even makes difficult the obtaining of an adequate supply of cadmium to fill the demand for bearing alloys of the type in question. Likewise, though cadmium-silver-copper alloys have a fair resistance to corrosion, there is room for improvement. Likewise, the freedom from drossing could be enhanced. Also, it will be realized that the use of silver in a bearing metal, even in relatively low percentages, tends to increase the cost of the metal, unless balanced by additions of cheaper elements.

One of the objects of this invention is to provide a bearing metal which will possess all of the advantages of the cadmium-silver-copper bearing metals now being marketed and which will be free from the disadvantages enumerated immediately above. For example, it is desirable to reduce the percentage of cadmium used. It is desirable to reduce the cost of the bearing metal. It is desirable to increase the resistance to corrosion and freedom from drossing. In short, it is desirable to produce a bearing metal which will have the advantages of the cadmium-silver-copper bearing metal without any of the disadvantages thereof and which will be as easy to handle in manufacturing as tin-base and lead-base bearings.

Our invention contemplates the production of a bearing metal alloy wherein the primary ingredients are cadmium, zinc and lead. Preferably, cadmium is the principal ingredient, in percentage by weight, with zinc and lead in smaller percentages by weight constituting the greater part of the remainder. We have found that such an alloy is highly suitable for service as a bearing metal for bearings designed for use in the automotive industry. We have also found that small amounts of other elements such as copper, silver and nickel may be advantageously added to our cadmium-zinc-lead alloy in small percentages, either singly or collectively.

At the present time, our tests have shown that a bearing metal alloy made by melting together 70 per cent by weight of cadmium, 15 per cent by weight of zinc and 15 per cent by weight of lead is superior to cadmium-silver-copper bearing metal alloys for use in the automotive industry in several important respects. It is even more markedly superior to lead-base and tin-base bearing alloys with which we are familiar.

Thus, a bearing metal alloy containing 70 per cent by weight of cadmium, 15 per cent by weight of zinc and 15 per cent by weight of lead was found to possess a Brinell hardness of 35.3. It was found to be highly satisfactory from the standpoint of resistance to fracture and from the standpoint of ductility and castability. Physical properties of several alloys made in accordance with our invention are shown in comparison with a standard tin-base alloy in the following tabulations:

*Physical properties*

| Alloy | | Brinell hardness | | | Tensile strength lbs. per sq. in. | | | | Elongation percent in 2″ | |
|---|---|---|---|---|---|---|---|---|---|---|
| | | Room temp. | 212° F. | 300° F. | Room temp. | 212° F. | 300° F. | 400° F. | Room temp. | 300° F. |
| 1 | Sn 87.50 Cu 5.75 Sb 6.75 (S. A. E. #11) | 29 | 12 | 8.0 | 10,750 | | 3,500 | 1,500 | 4.6 | 20 |
| 2 | Cd 74 Zn 13 Pb 13 | 35 | 16.5 | 10.9 | | | | | | |
| 3 | Cd 71 Zn 14 Pb 15 | 34.4 | 15.9 | 9.8 | | | | | | |
| 4 | Cd 70 Zn 15 Pb 15 | 35 | 16 | 9.8 | 15,200 | 8,750 | 5,125 | 2,875 | 19.5 | 28 |
| 5 | Cd 69 Zn 16 Pb 15 | 34.4 | 16.5 | 9.8 | | | | | | |
| 6 | Cd 66 Zn 17 Pb 17 | 34.4 | 17.2 | 9.6 | | | | | | |

Note: Tensile strength and elongation of other Cd-Zn-Pb alloys given almost exactly like alloy No. 4.

Comparing the properties of the Cd-Zn-Pb alloys with those of S. A. E. #11, a standard tin-base composition, the above shows their marked superiority in hardness, tensile strength and elongation at room and elevated temperatures.

Though physical properties alone are not a complete criterion, any bearing alloy which is to replace a tin-base bearing metal alloy should desirably have superior physical properties. The above tabulation shows clearly that our preferred cadmium-lead-zinc alloy possesses physical properties which are distinctly superior to a commonly used tin-base bearing metal.

As indicated above, it is also desirable that our cadmium-lead-zinc bearing alloy have a higher melting point than customarily used tin-base bearing metals. One reason for this is that, as a general rule, a higher melting point is attended by an increase in all physical properties at elevated temperatures. It has been found that the melting point of our cadmium-lead-zinc alloy is from 25 to 50 degrees above that of tin-base alloys, of which the above described tin-base alloy is representative.

From the above it will be seen that we have provided a bearing alloy which is superior to any tin-base bearing alloy. It has superior physical properties. It also has a higher melting point.

Our preferred bearing metal, containing 70 per cent cadmium by weight, 15 per cent lead by weight and 15 per cent zinc by weight, has been mounted as lining material on steel backings and, together with similarly mounted bearing metal containing 87.50 per cent tin by weight, 5.75 per cent copper by weight and 6.75 per cent antimony by weight, has been tested on a G. M. type bearing test machine. The two materials were tested under identical running conditions and at the end of the test our cadmium-zinc-lead bearing showed no indication of failure while the tin-copper-antimony bearing cracked and failed. In addition, an eight cylinder automobile engine of popular make was fitted with connecting rod bearings of our cadmium-zinc-lead alloy bonded to a steel back and run on a dynamometer for 150 hours. The bearings were in excellent condition at the end of the test, while a set of tin-base bearings run under like conditions showed almost complete failure.

This preferred alloy of cadmium-lead-zinc lies on the zinc side of the cadmium-zinc eutectic, so that the primary constituent of this eutectic is zinc. In photomicrographs, the ternary eutectic is apparent.

A number of bearing alloy metals containing cadmium, lead and zinc have been made, examined and tested. For example, we have made an alloy containing 70 per cent of cadmium by weight, 20 per cent of zinc by weight and 10 per cent of lead by weight. This alloy showed a Brinell hardness of 39.5 and possessed other physical properties of a desirable character.

Considering the various alloys containing cadmium, lead and zinc which we have made, we do not desire to limit ourselves to the particular percentages of the constituents given above. We believe that we are the first to provide a bearing metal alloy whose chief ingredients are cadmium, lead and zinc. We prefer bearing alloys embodying 50 to 90 per cent of cadmium, 5 to 45 per cent of lead and 5 to 45 percent of zinc.

In order to give a more clear understanding of the results which we have attained by the various compositions included within the ranges set forth herein, we have appended to this specification a drawing embodying a constitutional diagram of a portion of the cadmium-zinc-lead system, namely, that portion representing alloys wherein the cadmium content is in excess of 40 per cent by weight. On this diagram, there are represented 24 different alloys which we have made and studied, some of which are cadmium-zinc alloys, some of which are cadmium-lead alloys and some of which are cadmium-zinc-lead alloys. These different alloys are indicated by numerals running consecutively from 1 to 24 and, as customary, their positions on the constitutional diagram indicate the proportions of the ingredients used. The diagram also shows a curved dot and dash line A—B and a curved dash line I—M.

One of the striking characteristics of our ternary alloy is that it embodies a matrix which is formed of the cadmium-zinc eutectic, small particles of excess zinc or cadmium and particles of cadmium-lead-zinc eutectic. The result is a matrix of cadmium-zinc eutectic which is relatively tough and hard and which has dispersed through it particles of excess zinc or cadmium and particles of cadmium-lead-zinc, which particles are apparently somewhat softer than the matrix. It has been found that these particles which are apparently relatively soft actually produce a better bearing metal, although this appears to be somewhat at variance with the more widely accepted theory that the most desirable bearing metal should embody a relatively soft matrix with a multiplicity of small hard particles dispersed throughout.

While we do not desire to be limited to any particular theory, we prefer that the cadmium, zinc and lead be present in the bearing metal in such proportions that the matrix is predominantly formed of the cadmium-zinc eutectic and that it have dispersed throughout either excess zinc or cadmium particles and particles of the cadmium-lead-zinc eutectic. Those ternary alloys falling above the line A—B will have particles of excess cadmium. Those falling below line A—B will have particles of excess zinc.

Another striking phase of our invention bears a definite relation to the fact that with alloys falling within the range below the line I—M on the said constitutional diagram, the metal, even in a liquid state, separates into two relatively immiscible layers each containing the three elements in different proportions. Thus, the ternary alloys whose ingredients are so proportioned that they fall within this area below line I—M show, upon solidification, the phenomenon known as segregation so that photomicrographs show two distinctly separate layers of metal. One important effect of this is that, with the ternary alloy, it is necessary to maintain a relatively high cadmium content which, under present market conditions, means a relatively high cost.

We have discovered that this tendency towards segregation can be overcome to a very material extent by the addition of one or more elements in conjunction with cadmium, lead and zinc. Among these elements are copper, silver and nickel and we have found that the addition of small percentages of one or more of these elements makes possible the use of a substantially lower percentage of cadmium without the occurrence of the segregation phenomenon described above. We may use these elements either singly or collectively. We preferably use copper, not in excess of 1 per cent, together with silver, not in excess of 1 per cent, though markedly advantageous results can be obtained by the use of copper alone, not in excess of 1 per cent, or silver alone, not in excess of 1 per cent. Likewise, advantageous results are obtainable with nickel, not in excess of 1 per cent. If three of these additional elements are used, they are preferably each used in amounts not in excess of 1 per cent. However, we believe that we are the first to realize that one or more of these or similar elements may be added to a cadmium-lead-zinc alloy so as to permit the use of smaller amounts of cadmium while at the same time preventing segregation and making possible the production of a homogeneous alloy. Therefore, we do not desire to be limited to any particular percentage of this added metal.

One bearing alloy that we have made and found to be of a homogeneous nature and to give desirable bearing characteristics consists of 58 per cent of cadmium, 15 per cent zinc, 25 per cent lead, 1 per cent copper and 1 per cent silver. However, as indicated above, this is merely illustrative.

We believe that our cadmium-lead-zinc bearing metal alloys are at least as good as any bearing alloy at present being marketed for use particularly in the automotive industry. They are cheaper than cadmium alloys which are being marketed at the present time. They require less cadmium which is desirable because of the shortage of supply and the relatively high cost of cadmium. They possess a superior resistance to corrosion. They are free from drossing and, as a matter of fact, are as easy to handle in manufacture as tin-base or lead-base alloys.

Actual use of our preferred bearing metal for substantial periods of operation apparently leaves the bearing surface highly glazed and reddish-brown in appearance. This surface is apparently as smooth as glass.

Having thus described our invention, what we claim is:

1. A bearing metal alloy consisting of 58 per cent cadmium, 15 per cent zinc, 25 per cent lead, 1 per cent copper and 1 per cent silver.

2. A cadmium-base bearing metal alloy consisting of from 5 to 45 per cent lead, from 5 to 45 per cent zinc and from 50 to 90 per cent cadmium, together with at least one of the metals from the group consisting of copper, silver and nickel in a relatively small percentage not exceeding 1 per cent each to prevent segregation.

3. A cadmium-base bearing metal alloy consisting of from 5 to 45 per cent lead, 5 to 45 per cent zinc, 50 to 90 per cent cadmium, together with at least one of the metals from the group consisting of copper, silver and nickel in a relatively small percentage ranging from 0.1 to 1.0 per cent each to prevent segregation.

4. A cadmium-base bearing metal alloy consisting of from 5 to 45 per cent lead, from 5 to 45 per cent zinc and from 50 to 90 per cent cadmium.

5. A cadmium-base bearing metal alloy consisting of 15 per cent zinc, 15 per cent lead and the balance cadmium.

6. A cadmium-base bearing metal alloy containing from 5 to 45 per cent lead, from 5 to 45 per cent zinc and the balance substantially all cadmium, the cadmium always being present in amounts not less than 50 per cent and the said alloy having a Brinell hardness in excess of 29, and a tensile strength greater than 10,750 pounds per square inch.

ERNEST R. DARBY.
PHILIP J. POTTER.